United States Patent [19]

Albern et al.

[11] 4,261,539
[45] Apr. 14, 1981

[54] ADJUSTABLE CLAMPING MEANS FOR FASTENING ELONGATED ARTICLES TO A HOLDING MEANS

[75] Inventors: Helmut Albern, Quickborn; Günter Wibrow, Norderstedt, both of Fed. Rep. of Germany

[73] Assignee: ITW Ateco G.m.b.H., Norderstedt, Fed. Rep. of Germany

[21] Appl. No.: 83,049

[22] Filed: Oct. 9, 1979

[30] Foreign Application Priority Data

Nov. 2, 1978 [DE] Fed. Rep. of Germany ...... 2847505

[51] Int. Cl.³ .............................................. F16L 3/08
[52] U.S. Cl. ................................. 248/73; 24/16 PB; 248/74 PB
[58] Field of Search .................. 248/74 PB, 73, 74 B, 248/223.1; 24/16 PB, 81 CC, 73 PB, 17 AP, 30.5 P, 268, 206 A, 73 PF

[56] References Cited

U.S. PATENT DOCUMENTS

| 2,710,161 | 6/1955 | Haberstump | 248/223.1 X |
| 3,054,585 | 9/1962 | Roberts et al. | 248/74 PB |
| 3,125,316 | 3/1964 | Wilmhoff | 248/223.1 X |
| 3,262,663 | 7/1966 | Jansson | 248/74 PB |
| 4,132,381 | 1/1979 | McClellan | 248/74 PB X |
| 4,149,298 | 4/1979 | Forest | 248/74 PB X |

FOREIGN PATENT DOCUMENTS

| 1318688 | 1/1963 | France | 24/16 PB |
| 1294435 | 10/1972 | United Kingdom | 24/16 PB |
| 1438758 | 6/1976 | United Kingdom | 248/73 |

Primary Examiner—J. Franklin Foss
Attorney, Agent, or Firm—Thomas W. Buckman; Jack R. Halvorsen

[57] ABSTRACT

The invention relates to an adjustable clamping means for fastening elongated articles, especially cable trunks or the like, to a holding means, comprising a holding section provided with a slot equipped with arresting means for fitting at a plug type bolt fastened at the holding means, said holding section being pivotally connected at the one side thereof to a flexible strap member equipped with clamping elements for embracing the elongated article, and being connected at the opposite side thereof to an interlocking portion adapted to be brought into interlocking engagement with the clamping elements of the strap member.

10 Claims, 3 Drawing Figures

ADJUSTABLE CLAMPING MEANS FOR FASTENING ELONGATED ARTICLES TO A HOLDING MEANS

BACKGROUND OF THE INVENTION

Such a device is known (German publication letter No. 18 10 515). A toothed strap integrally formed with the holding section in a manner to be capable of articulation is inserted through a locking portion by the free end thereof, said locking portion being likewise formed integrally with the holding section in a manner to be capable of articulation. The toothed strap in this arrangement may for example embrace a cable trunk or a bunch of cables, and keep them together. The holding section is provided with a slot in the shape of a keyhole for the reception of a bolt type plug comprising a head, so that the clamping device may be fastened to a holding means, for instance, at a structural member of a vehicle body.

How to fasten a holding element at a plug type bolt is described already in the German patent letter No. 1 289 365. With the shank of the plug type bolt disposed in the seating slot whose width approximately corresponds to the diameter of the shank of the plug type bolt, suitable arresting means which are in engagement with the head of the plug type bolt serve to secure the seat once obtained.

To fix the position of electric cables or the like it has also become known to form a flexible arm integrally with a supporting member at one side thereof which may become arrested in an undercut of the supporting member by its free end and, in so doing, will embrace one or more cables. The supporting member is adapted to be fastened at the holding means with the aid of a fastening bolt in the form of a clip.

It has furthermore become known in connection with an adjustable clamping means for the reception of elongated articles integrally to form with the supporting member a semi-circular upward facing resilient reception member with a clamping portion formed in the manner of a sector supported in a joint in the center of said reception member, said clamping portion being provided with a toothing in the region of the circular arc thereof which may perform a ratcheting movement over a corresponding counter-toothing of the reception member, with the latter resiliently yielding, until the clamping portion runs up against the articles to be accommodated (German disclosure letter No. 2 516 844).

With a minimum thickness and/or with the thickness known of the elongated articles or a bunch thereof, the known clamping devices more or less fulfil the requirements they are expected to meet. Difficulties, however, will occur whenever the same clamping devices are to be used for different widths of opening of the usually formed annular loop, i.e. always in such a manner that the articles as received are tightly embraced. The known clamping devices normally require a minimum thickness of the elongated articles to be embraced, if they are still to be retained in tight clamping engagement.

SUMMARY OF THE INVENTION

The invention is therefore based upon the problem of providing an adjustable clamping device for fastening elongated articles, especially cable trunks or the like, which is adaptable in a very large extent to different dimensions of the elongated articles.

This problem is solved in accordance with the invention in that the strap member has a projection integrally formed therewith which with the clamping element and the interlocking portion being in interlocking engagement with each other, will extend into the opening of the annular connection that has been formed.

With the clamping device in accordance with the invention the projection allows of a small width of the annular opening by pressing the elongated article against the holding section and the remaining portions of the clamping device, respectively, tightly clamping it. While with the known clamping devices on the ground of tensile stress loads a certain shape of loop always will occur which will by no means guarantee always a safe clamping engagement of all the elongated articles, above all, in case several such articles are to be clamped tight, the projection at the strap member of the device according to the invention makes possible a radially, or at least approximately radially, directed force of contact pressure in order to safely fix the embraced articles. The opening width is again adjustable and is dependent on the clamping element getting into engagement with the interlocking portion.

A particularly excellent adaptability to different dimensions of the elongated articles to be received is guaranteed according to the invention, if the projection is formed by a preferably V-shaped or U-shaped portion of the strap member. Such a projection will come to lie in close contact against the article that has been received in the region of the apex thereof, while the legs due to the tied connection at the holding section and at the remaining strap member become more or less strutted. As with the aid of such a projection a bent leaf spring has been formed the embraced article may be clamped tight under a considerable tension.

In order to fully obtain the desired effect of the projection of the device according to the invention, provision is made in a further embodiment of the invention for the projection to be arranged adjacent the hinge connection of the strap member and the holding section.

Th effect of the projection with the device according to the invention is obtained independently of whether the strap member is connected in one piece with the holding section or whether it constitutes a separate member. When using synthetic material, however, the one piece connection of holding section and strap member is to be recommended.

The effect of the projection provided in the case of the device according to the invention is obtained, for example, also with a clamping device which operates using a toothed strap. It is especially advantageous, however, if in accordance with another embodiment of the invention provision is made for the interlocking portion to extend upwards from the holding section and to be provided with an interlocking nose extending from the free upper end thereof and for the strap member to be provided with several openings spaced from each other in an axial direction and adapted to be brought into interlocking engagement with the interlocking nose. Such an embodiment of the strap member offers the advantage of easy handling when clamping the elongated articles, as opposed perhaps to the somewhat difficult threading in of a toothed strap through the slot of a lock. Also the loosening of the strap member in case of dismantling becomes particularly simple.

Finally, it is possible to save material by the interlocking apertures in the strap member.

A particularly advantageous construction results if, in accordance with another embodiment of the invention, provision is made for the interlocking nose to have the shape of a hook with a downward pointing hook opening and for the strap member to be formed in the manner of a ladder, with the rungs extending transversely of the axial direction being capable of gripping beneath the hook. By simply pulling the strap member in the hook opening direction it is possible in a simple manner to tighten or loosen the strap member. The handling is rendered still more easy by provision being made in accordance with the invention for a gripping loop to be formed integrally with the strap member at the free end thereof. In contrast to the invention, a gripping loop cannot be used in connection with a toothed strap, because all the portions of the toothed strap must not exceed the width of the slot in the interlocking portion.

An irreproachable clamping engagement of embraced articles is obtained in accordance with another embodiment of the invention, according to which the interlocking portion comprises a flat web-like abutment section rigidly connected with the holding section which preferably extends the width of the holding section. Owing to the relatively rigid design of the holding portion—a certain amount of flexibility in itself and also vis-a-vis the holding section is unavoidable and not detrimental either—there is an abutment formed for the strap member being effective as a spring, in order to guarantee the tight clamping engagement.

According to another embodiment of the invention the handling is further facilitated by two lugs integrally formed with the interlocking hook on either side thereof said lugs extending beyond the interlocking hook and being spaced from each other through a distance slightly greater than the width of the strap member. The lugs are forming a guide for the strap member until such time as an interlocking engagement has been brought about.

With the known clamping device described at the beginning there are arresting noses projecting into the slot of the holding section which become slightly deformed before the shank of the plug type bolt has reached the seating portion of the slot. With too hard a material the danger exists that they may become deformed permanently and consequently will not be able to perform a sufficient safety function. With too soft a material the danger exists that in case of loads or shocks occurring the holding section may independently loosen from the bolt. Therefore, provision is made in another embodiment of the invention for the slot in the holding section to be open to one side of said holding section and to be provided with a seating portion of a width corresponding to the diameter of the bolt, and with a portion of introduction tapering towards the seating portion the width thereof at the introduction end corresponding at least to the diameter of the head, with an arresting projection provided above the portion of introduction spaced from the upper edge of the slot through a distance smaller than the height of the head of the bolt, and with the arresting projection and/or the holding section being elastically yielding in the region of the slot. In contrast to the known embodiments, the head of the plug type bolt in this arrangement is secured, with the arresting projection having to be looked upon as being almost rigid in the loading direction of the bolt head and arresting projection, while the latter or a portion of the holding section is without any further ado elastically shapable in a direction approximately vertically thereof in order to make possible the introduction of the head of the bolt without any further ado until rearward snapping engagement is effected in the arresting step. Correspondingly, also the dismantling of the holding section from the head of the bolt is as easy as may be imagined in that the arresting projection and the holding section are moved apart from each other with the aid of a suitable tool so much that the head of the bolt may without any further ado pass through said distance. The mounting and dismantling operations may be accomplished in a particularly simple manner if, in accordance with a further embodiment of the invention, the arresting projection is formed of a tongue capable of being elastically bent. Ramp-like areas arranged on either side of the portion of introduction are effective to perform the automatic deformation of the tongue capable of being elastically bent for the purpose of introducing and arresting the head of the plug type bolt.

BRIEF DESCRIPTION OF DRAWINGS

An example of embodiment of the invention will be described in the following by way of the drawings. In the drawings.

DETAILED DESCRIPTION

Figure 1:
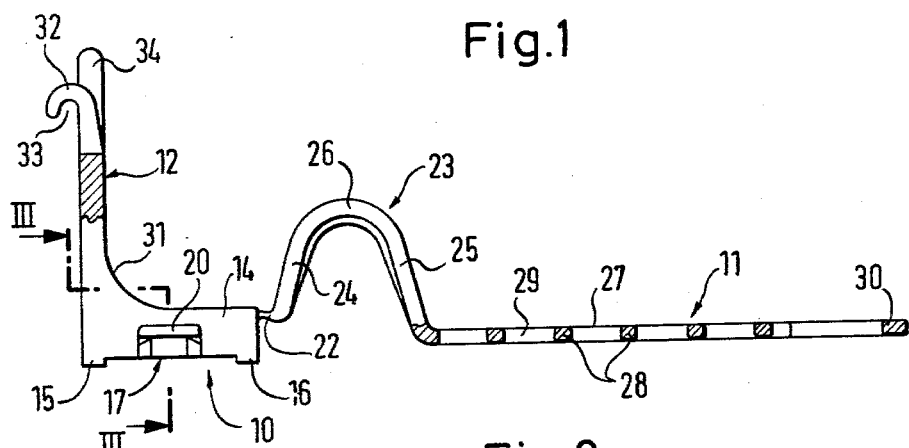
FIG. 1 shows a partly sectional side view of a fastening device according to the invention, FIG. 2 a top plan view of the representation according to FIG. 1.

Prior to enlarging in more detail on the constructional features of the example of embodiment as shown in the drawing and described in the following, let it be emphasized that all these features are of essential significance to the invention either by themselves in connection with the features of the claims.

Figure 2:
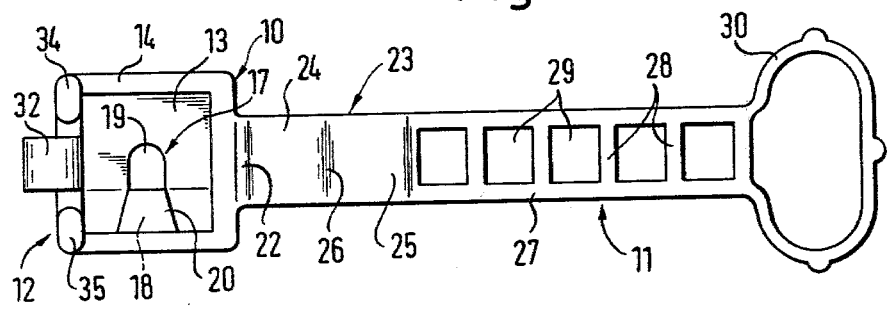
Figure 3:
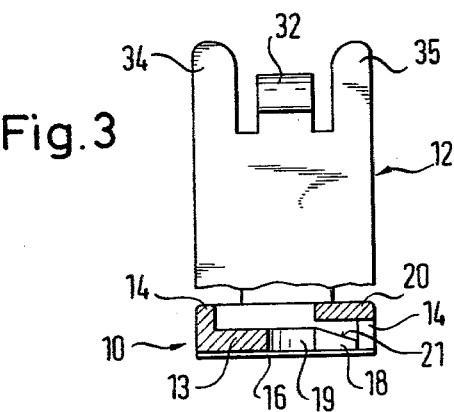
FIG. 3 shows a sectional view of the fastening device according to FIG. 1 taken on line 3—3.

The clamping device shown in FIGS. 1 to 3 is composed of a holding or supporting section 10, a strap member 11 and an interlocking portion 12. The supporting section 10 comprises a rectangular bottom portion 13 surrounded by an elevated edge on three sides thereof. On the underside there are two ledge-like supporting feet 15 and 16, respectively, formed integrally therewith on opposite sides thereof. The bottom portion 13 is provided with a slot 17 to one side thereof said slot being composed of a portion of introduction 18 and a seating portion 19. The portion of introduction 18 tapers in the form of a triangle in a direction towards the seating portion.

As may be seen from FIG. 3, the edge in the region of the slot 17, too, is interrupted. The width at the entry end of portion of introduction corresponds to the diameter of the head of a plug type bolt (not shown), while the seating portion 19 is of a width corresponding to the diameter of the shank of the plug type bolt. A flexible tongue 20 extends from the associated edge above the slot 17 the free end of said tongue terminating at the beginning of the seating portion 19. The underside of the flexible tongue 20 is spaced from the upper surface of the bottom portion 13 through a distance which is less than the height of the head of a plug type bolt.

As may be recognized furthermore from FIG. 3, the bottom portion 13 is tapered in the shape of a ramp on either side of the portion of introduction 18, as may be seen at 21. If the plug type bolt is being introduced and the supporting portion 10 is being pushed onto the head of a plug type bolt, respectively, which is arranged in a fixed position, the underside of the head of the plug type bolt will slide along the ramp-like surface 21 and in so doing will deflect the flexible tongue 20 upwards. As soon as the plug type bolt is seated in the seating portion 19, the free end of the tongue will snap backwards and will come to lie against the edge of the plug type bolt which thus is interlocked.

The underside of the interlocking tongue may, besides, likewise be tapered in the form of a ramp opposed to the slope 21, in order to obtain a still stronger interlocking effect.

On the outside of the one edge 14 extending in parallel with the slot 17 the strap member 11 is formed at the slot portion 10 to be integrally connected with it via a hinge connection 22. Immediately adjacent the hinge connection 22 in the representation according to FIG. 1 the strap member 11 is provided with an upwardly vaulted portion 23 which consists of two upwardly diverging straight legs 24, 25 and an arcuately vaulted web 26 interconnecting them. The portion 27 of the strap member 11 adjoining the leg 25 at the lower end thereof is designed in the shape of a ladder with uniformly spaced transverse rungs 28 forming interlocking openings 29 therebetween. A gripping loop 30 is formed integrally with the strap member 11 at the free end thereof.

From the side of the supporting section 10 opposite the hinge connection 22 the interlocking portion 12 extends vertically upwards with respect to the supporting portion 10 (in FIG. 1). The edges 14 extending vertically with respect thereto in this arrangement merge arcuately with the interlocking section 12 as shown at 31. The flat interlocking portion formed relatively rigidly at the slot portion 10 to be integral therewith is provided with an interlocking hook 32 in the center of the upper end thereof said hook having a downward facing hook opening 33. Lugs 34 and 35 are formed at the interlocking portion 12 on either side of the interlockng hook 32 which extend beyond the interlocking hook 32 and are spaced from each other through a distance slightly greater than the width of the strap member 11. At the free ends thereof the lugs 34, 35 are rounded off so as to facilitate the placement of the strap member 11.

In the mounting operation a bunch of cables, for example, is placed on the upper surface of the supporting portion 10 either before or after the supporting portion has been fastened to a plug type bolt. Subsequently, the strap member 11 is pivoted upwardly by seizing the gripping loop 30 and the portion 20 bent into the region between the lugs 34, 35. As a result the projection 23 will come to lie against the bunch of cables pressing it against the upper surface of the edge 14 and against the vault 31 or the interlocking portion 12, respectively. By forcefully pulling at the gripping loop 30 the legs 34, 35 will spread in a more or less strong degree so that depending on the diameter of the respectively located cable trunk a rung 28 may be introduced into the hook 32, in order to keep the bunch under tension tightly embraced.

What is claimed is:

1. Adjustable plastic clamping means adapted for fastening elongated articles, especially cable harnesses or the like, to a support means, comprising a holding section having edges (14) and provided with means for fastening to said support means, an integral flexible strap member (11) pivotally connected at one end (22) to a side edge (14) of said holding section, said strap member including clamping elements for embracing the elongated articles, the opposite side edge of said holding section including an interlocking portion adapted to be brought into interlocking engagement with the clamping elements of the strap member, characterized in that the interlocking portion (12) extends upwards from the holding section (10) and comprises an interlocking nose (32) extending from the upper end away from the strap member, and in that the strap member (11) is provided with axially spaced openings (29) adapted to be engaged with the interlocking nose (32), said interlocking portion (12) blending by a curved portion (31) into the edges (14) of said holding section (10) and a projection (23) formed by a preferably V-shaped or U-shaped bent portion of the strap member (11) said projection being generally convexly complimentary to said edges (14) and curved portion (31) whereby upon interlocking engagement of the clamping element (28) and the interlocking portion (12) said projection extends into the opening of the annular connection formed and presses said cables against the upper surface of said edges (14) and said curved portion (31).

2. Clamping device according to claim 1, characterized in that the projection (23) is arranged adjacent the pivotal connection (22) of strap member (11) and holding section (10).

3. Clamping device according to claim 1, characterized in that the interlocking nose is of a configuration in the shape of a hook (32) with downwardly facing hook opening (33) in the direction of holding section (10) and in that the strap member (11) is formed like a ladder with the rungs (28) extending transversely of the axial direction, said rungs capable of engaging beneath the hook (32).

4. Clamping device according to claim 1, characterized in that there is a gripping loop (30) formed integrally with the free end of the strap member (11).

5. Clamping device according to claim 3, characterized in that the interlocking portion (12) comprises a substantially rigid flat wall-like portion connected with the holding portion (10) and preferably extending the width of the holding portion (10).

6. Clamping device according to claim 5, characterized in that there are lugs (34, 35) formed at both sides of the interlocking hook (32) which extend above the interlocking hook (32) and are spaced from each other through a distance slightly greater than the width of the strap member (11).

7. Clamping device according to claim 1 characterized in that the holding section (10) includes a slot (17) which opens through one side of the holding section (10) and is provided with a seating portion (19) of a width corresponding to the diameter of the bolt and with an introducing portion (18) tapering towards the seating portion (19), the width of said introducing portion at the introducing end thereof being in correspondence at least with the diameter of the bolt head, an arresting projection (20) positioned above the introducing portion (18) and spaced from the upper edge of the slot (17) by a distance smaller than the height of the bolt head with the arresting projection (20) and/or the holding section (10) are elastically yieldingly shapeable in the region of the slot.

8. Clamping device according to claim 7, characterized in that the arresting projection is a tongue (20) capable of being elastically bent.

9. Clamping device according to claim 8, characterized in that the tongue (20) is provided with a wedge surface at the underside thereof extending towards the slot (17).

10. Clamping device according to claim 7, characterized in that there are ramp-like surfaces (21) formed on both sides of the introduction portion of the slot (17) sloping upwards in the direction of the seating portion (19).

* * * * *